United States Patent

[11] 3,565,193

| [72] | Inventor | Walter Wirth<br>Uitikon (Zurich), Switzerland |
|---|---|---|
| [21] | Appl. No. | 788,844 |
| [22] | Filed | Jan. 3, 1969 |
| [45] | Patented | Feb. 23, 1971 |
| [73] | Assignee | August Sauter KG<br>Ebingen Wurttemberg, Germany |
| [32] | Priority | Jan. 8, 1968 |
| [33] | | Switzerland |
| [31] | | 170/68 |

[54] ELECTRICAL WEIGHER USING VIBRATING STRINGS
13 Claims, 1 Drawing Fig.

[52] U.S. Cl. ................................................. 177/1,
73/67.2, 177/210
[51] Int. Cl. ..................................................... G01g 3/16,
G01g 23/365, G01g 23/37

[50] Field of Search ........................................... 177/1, 210;
73/67, 67.2

[56] References Cited
UNITED STATES PATENTS

| 2,694,310 | 11/1954 | Pounds .................. | 177/210X |
| 3,366,191 | 1/1968 | Reid et al. .................. | 177/210 |

FOREIGN PATENTS

| 685,598 | 5/1964 | Canada .................. | 177/210 |
| 622,581 | 12/1935 | Germany .................. | 177/210 |

*Primary Examiner* — Robert S. Ward, Jr.
*Attorney* — Werner W. Kleeman

ABSTRACT: The specification describes a weighing apparatus using a vibrating string whose tension depends on the weight to be weighed. Electronic counters are used for deriving the weight from the frequency of vibration.

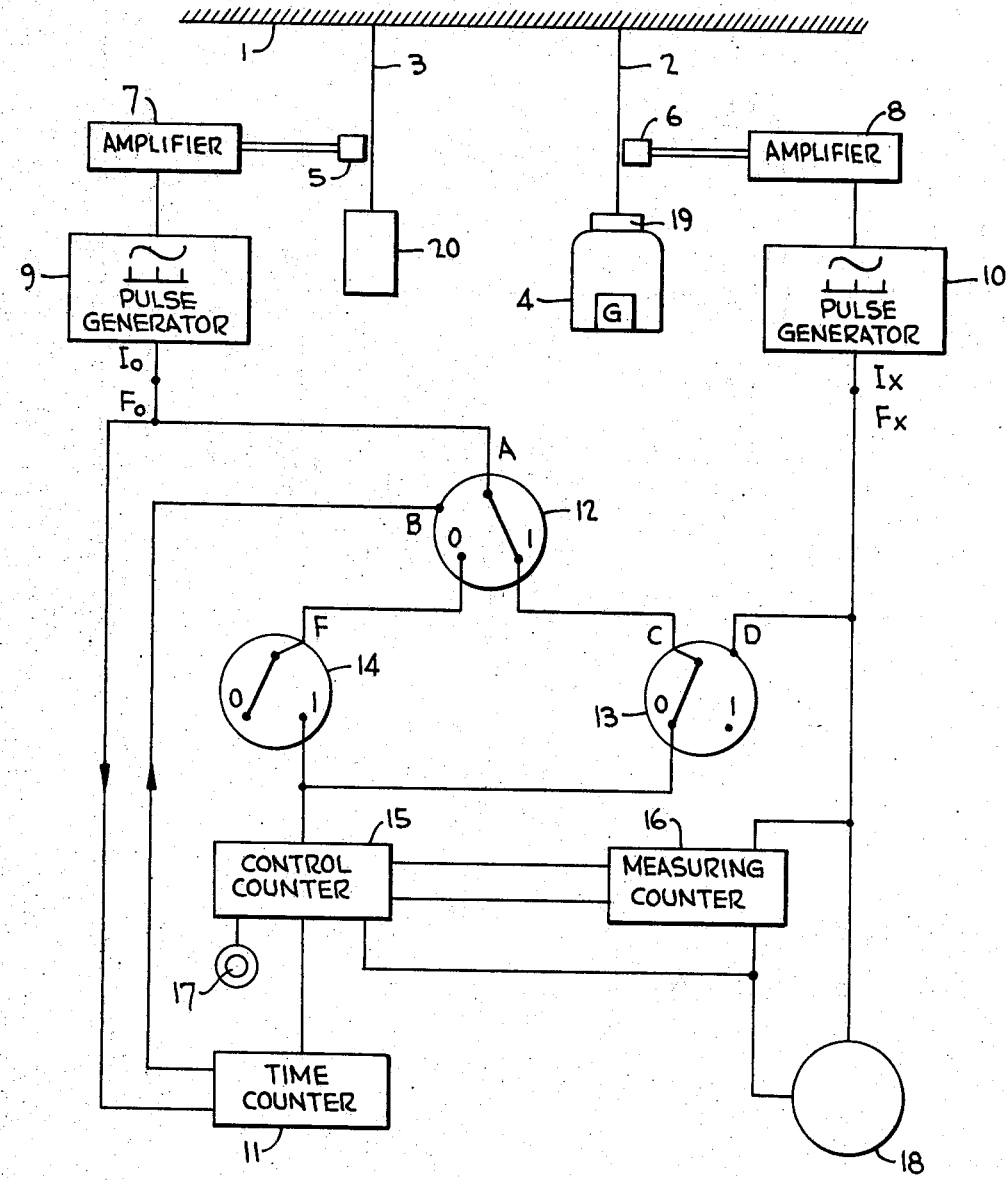

ELECTRICAL WEIGHER USING VIBRATING STRINGS

The present invention relates more particularly to the digital determination of the square of the ratio of a signal frequency $f_x$ to a constant basic frequency $f_{xo}$ using counting means with the help of a constant reference frequency $f_o$, the signal frequency range extending from the basic frequency $f_{xo}$ to $n$ times the basic frequency.

In metrology it is often necessary to determine the numerical value of a physical quantity indirectly via the ratio of two frequency values of a variable frequency oscillator, the numerical value of the magnitude to be measured being proportionally represented by signal frequency, while another frequency, the basic frequency, is proportional to the unit in which the magnitude is to be measured.

The oscillator used for this purpose can be any means capable of producing oscillations at a frequency which is influenced by the magnitude to be determined. Usually a device is preferred whose frequency ratio is a linear function of the numerical value of the magnitude. However, it is often necessary to use a device in which the numerical value of the magnitude to be determined is represented by the square root of the frequency ratio. The use of such a device may be due to the absence of any other practicable form of device, or to particular advantages offered.

Such a device is, for example, a vibrating string or cord which vibrates with a frequency of basic natural vibration equal to $f=k\sqrt{\sigma}$, that is to say proportional to the square root of the tension. Vibrating string weighing means are known in which the weight of the object to be weighed is determined from the ratio of the frequencies of vibration of the string when it is loaded with the weight and when it is not loaded with the weight. Such vibratory systems have the disadvantage that a digital indication of the numerical value of a magnitude can only be arrived at using complicated means for squaring the frequency ratio.

One aim of the present invention is to provide a method and device for arriving at the square of the ratio of two frequency values which can be carried out by using simple and efficient means which are reliable in operation.

The present invention consists in a method for digitally computing the square of the ratio $Q$ of a signal frequency to a constant basic frequency $f_{xo}$ using a constant reference frequency $f_o$, the signal frequency lying between the value of the basic frequency and $n$ times the basic frequency, comprising the steps of producing a series of electrical pulses $I_x$ with a frequency $F_x$ proportional to the signal frequency $f_x$, feeding this series of pulses to a first counting means for counting, producing a series of electrical reference pulses $I_o$ with a frequency $F_o$ $n$ times greater than the basic frequency $F_{xo}$ having the same proportional relationship to the frequency $f_{xo}$, feeding the reference pulses $I_o$ for counting to a second counting means, feeding pulses $I_o$ in excess of pulses $I_x$ to a third counting means during a first counting phase and during a following phase feeding every $m$th reference pulse to the third counting means, $m$ and $n$ being at least approximately equal, counting in all three counting means beginning at the same time, switching over the third counting means from the first counting phase to the second phase taking place when the second counting means has received so many reference pulses $I_o$ that its count $Z_z$ stands at $n \times k$, $k$ being an arbitrary constant, and the first counting means counting the pulses $I_x$ is switched off when the third counting means has reached a count equal to $K$ $n=1$), the count $Z_M$ of the first counting means then being at least approximately $KQ^2$.

If $Q^2$ is to be exactly computed, $m$ is equal to $n$. $m$ and $n$ can be equal to a positive whole number.

Alternatively $m$ can be made greater than $n$ so that the count $Z_M$ obtained corresponds to a value greater than $KQ^2$. If $n$ is less than $m$ the count $Z_M$ obtained is less than $KQ^2$.

$m$ can be a positive whole number and $n \geqq m$.

In the counting of these signal pulses $I_x$ in the first counting means counting can be continued in the first phase up to a count equal to the value of $K$ and in the second phase counting can take place starting at unity from the numerical value of the constant $K$ to the end of counting, the count at the end of the second phase being indicated.

The present invention also consists in an apparatus for digitally computing the square of the ratio $Q$ of a signal frequency to a constant reference frequency, comprising: first, second, and third counting means, the first counting means being arranged to be switched off by a switching off pulse; a switching means which is arranged to be actuated by a control pulse from the second counting means; a scaling means; a mixing gate; a pulse generator for producing signal pulses $I_x$, the output of this pulse generator being connected with the input of the first counting means; a second pulse generator adapted to produce reference pulses $I_o$, the output of the latter generator being connected with the second counting means, the second counting means being adapted to give a control pulse when it has reached a certain preset count, the third counting means passing a switch off pulse to the first counting means, the input of the third counting means being connected in response to the switching means as controlled by the control pulse of the second counting means successively with the output of the two pulse generators via the mixing gate, which is arranged only to allow the passage of pulses $I_o$ in excess of signal pulses $I_x$ for counting, and with the output of the reference pulse generator via the scaling means; and a switch on circuit means which is associated with the counting means and with the switch means, the switch on circuit means serving to bring the switch means into a starting condition and to initiate operation of all three counting means.

The switch on circuit means can comprise a push button and can be adapted to bring about automatically repeated operation of the apparatus at regularly successive points in time.

The apparatus can further comprise a frequency monitoring means responsive to the pulses $I_x$ and arranged to give a resetting pulse to the counting means when a variation in the frequency of the pulses $I_x$ occurs during operation.

The invention is now particularly described with reference to a force measuring apparatus which can be used for determining weights, reference being had to the accompanying drawing.

The single FIG. of the drawing shows a vibrating string weighing means and an example of means for digitally computing the square of the ratio between two frequency values.

In a vibrating string weighing apparatus, the weight of an article to be weighed is determined from the frequency of the string as it vibrates while subject to the tension produced by the weight of the article. The string is also subject to a pretension $P$ which is determined by the construction of the weighing apparatus and for practical purposes is to be regarded as being constant. The additional tension $P$ of the string produced by the weight of the article when the weighing apparatus is loaded can conveniently be expressed in multiples of $P$, $P$ being taken as a unit, that is to say $L = xP$. Taking the frequency of vibration of the string under the pretension alone as being $f_{xo}$ and the frequency of the string additionally loaded by the weight as being $f_x$, we have $f_x = f_{xo}\sqrt{1+x}$ The vibrations of the string can be counted by means of a counting means. If full vibrations of the loaded string are counted, the counting means will indicate a value $Z$ after a time $t$ of $ZZ = tf_x = tf_{xo}\sqrt{1+x}$ and $X = L/P$ can be derived from the value indicated by the counting means. However, a direct indication of $x$ is to be preferred. This direct indication can be obtained, by digitally computing the square of the frequency ratio $f_x/f_{xo}$, since $(f_x/f_{xo})^2 = (1+x)$. The numerical value of the count $Z_M$ indicated becomes proportional to $(1+x)$ if the counting time is extended by the factor $1+x$, i.e.

$Z_M = t \; 1+xf_x = tf_{xo}(1+x)$

Since $f_{xo}$ denotes the frequency of the string with the pretension $P$ and since for the weighing apparatus a constant and the counting time $t$ can be chosen as desired, it can be insured that $tf_{xo}$ is a round number $K$, for example 10,000, the excess of the numerical value $Z_M$ over this simple constant $K$, which can easily be counted, being proportional to $X$ $X = (Z_M - K)/K$.

Referring now to the diagrammatically shown vibrating string weighing device and the computing apparatus shown in the FIG., it will be seen that a string 2 for carrying out measurements, and a reference string 3 are fixed to a support 1 in the housing of the weighing apparatus. The reference string or cord is tensioned by a weight 20 so that when excited it vibrates with a constant frequency $f_o$. The measuring string or cord 2 carries at its lower end a tensioning weight $K_1$ with a pan 4 for carrying the article G to be weighed. Instead of the pan it is possible for the string or cord to be attached to one end of a weighing beam whose other end is connected with the article to be weighed, the beam forming part of a balance of otherwise conventional structure. In what follows it is assumed for the sake of simplicity that the weight of the article is to be determined directly, that is to say without a pivoted beam acting as a step down mechanical linkage. The strings are provided with exciting means 5 and 6, respectively, for causing undamped vibration in the strings. The exciting means 5 and 6 serve simultaneously as frequency sensing means and are continuously driven by amplifiers 7 and 8 acting through regenerative couplings. At its output, each amplifier 7 and 8 supplies an AC voltage whose frequency is equal to the frequency of the associated string. Connected with the output of each amplifier 7 and there is a pulse generator 9 and 10 which yields short duration positive and negative pulses of high amplitude each time the AC voltage falls to zero, the positive pulses and the negative pulses following in alternate succession in accordance with the frequency of the AC voltage supplied. By using suitable circuits it is possible to insure that all pulses are converted to the same polarity so that for each cycle of the AC voltage two, for example positive, pulses are obtained. The frequency of the pulses is thus twice that of the AC voltage. By doubling the frequency the sensitivity or resolution of apparatus is doubled. Alternatively, if increased sensitivity is not required, the weighing time can be halved without any decrease in accuracy.

The exciting means 5 and 6, the amplifiers 7 and 8 and the pulse generators 9 and 10 can be of conventional construction and do not require any further explanations.

A series of reference pulses $I_o$ appears at the output of the pulse generator 9 associated with the reference string 3 and these pulses have a frequency $F_o$ proportional to the frequency $f_o$ of the string. If there is a doubling in frequency then $F_o = 2 f_o$. At the output of the pulse generator 8 connected with the measuring string 2 there appears a series of basic or idle pulses $I_{xo}$ with the basic or idle frequency $F_{xo}$ when the pan 4 is not loaded while when the pan is loaded there appears a sequence of load signal pulses $I_x$ of the signal frequency $F_x$ to be determined representing the weight. The load and idle frequencies $F_x$ and $F_{xo}$ are proportional to the frequencies $f_x$ and $f_{xo}$ of the string vibrations with the weighing pan 4 loaded and unloaded respectively.

The reference pulses $I_o$ are fed to a first counter 11 which is referred to as a time counter, and simultaneously to a gate 12 operating as a switch. The time counter 11 can be a conventional counter and has a presetting arrangement so that on reaching the preset value a control pulse is generated.

The controlled gate 12 has two outputs 0 and 1 and is controlled by a control pulse from the time counter 11 in such a manner that the reference pulses $I_o$ fed to its input A pass to the output 1 but after switching over of the gate 12 by a control pulse pass to the output 0 until switching off occurs. The outputs 0 and 1 of the gate 12 are connected with further gate 13 and a scaler 14.

The second age 13, which is constructed as a mixing stage, has two inputs C and D. Input C is connected with the output 1 of the gate 12 and load signal pulses $I_x$ from the pulse generator 10 are fed to the second input D. The gate 13 also has two outputs 0 and 1, the former being connected with a control counter 15.

The load signal pulses $I_x$ fed to the input D of the mixing gate 13 switch the gate into the 1 condition and each reference pulse $I_o$ fed to the output C changes the gate 13 into the condition 0. If the mixing gate 13 is in the condition 1 and a reference pulse arrives, the gate will be switched into the condition 0 but no output will appear. A following pulse $I_o$ will give an output at 0 while a following pulse $I_x$ will switch the gate back into the 1 state.

In this manner the gate 13 only transmits those of the reference pulses $I_o$ which are in excess of the pulses $I_x$ of the load pulse sequence, that is to say at the output 0 there only appears a pulse sequence of the frequency $F_o - F_x$ which, as has already been mentioned, is fed to the control counter 15.

The scaler 14 constitutes a converting stage and its input is connected with 0 output of the gate 12 while its output is connected with the control counter 15. The scaler is so constructed that of the fed-in reference pulses $I_o$, it only transmits every $m$th pulse, $m$ being conveniently 2 or 3. At the output of the scaler there therefore appears a pulse sequence of the frequency $F_o/m$, which is fed to the control counter 15.

The load signal pulses $I_x$ of the pulse generator 10 are not only fed to the gate 13 but also to a measuring or load counter 16. This counter 16 counts the incoming load pulses $I_x$ after actuation by a switching-on pulse from counter 15 until it is switched off by a switching-off pulse. Load counter 16 constitutes the indicating part of the measuring apparatus and it is correspondingly constructed. For instance, if required, the counter can be provided with a printer.

The control counter 15 has presetting means, that is to say means which cause it to give a signal when a preset count is reached. Counting up to the preset count $Z_{St}$ occurs in two phases as determined by the condition by the switching gate 12. In the first phase (condition 1 of the gate 12) the control counter 15 receives the pulse sequence $F_o - F_x$ from the output 0 of the mixing gate 13 and in the second phase it receives the pulse sequence $F_o/m$ from the output of the scaler 14. On reaching the preset count $Z_{St}$, the counter 15 feeds a switching-off pulse to the load counter 16 and the time counter 11. The end of the first counting phase, i.e. the beginning of the second counting phase, is determined by the switching-over of the switching gate 12 from its output 1 to its output 0 and this occurs, as has already been mentioned, when the time counter has reached its preset count $Z_z$.

For starting operation of the measuring apparatus a pushbutton 17 is provided by means of which the counters can be set to zero and the switch gate 12 can be set in the condition 1 and the measuring apparatus is so prepared that when a pulse is received from the pulse generators the counters begin to count. Adjacent to the push button for switching on the apparatus for operation as is required, a repeating means can be provided which causes the weighing apparatus to repeat the measuring operations at regular intervals. Such devices i.e. pushbuttons for starting, and repeating devices are usually provided in commercial counters.

Finally it is convenient, more particularly in the case of measuring apparatus for use with vibrating string balances, to provide a frequency monitor 18 which, when there is a change in frequency in the sequence of load pulses $I_x$ during a measurement, transmits a resetting pulse to the counters so that measurement is interrupted and is begun afresh.

It should be mentioned again in this connection that all individual parts of the above-described apparatus are generally known and can be bought from electronics firms without difficulty, so that a detailed description of the units is not necessary.

The frequency $f_o$ of the reference string 3 determines the measuring range of the measuring apparatus. The unloaded measuring string or cord 2 vibrates with the basic or idle frequency $f_{xo}$ and the loaded measuring string vibrates at the higher load signal frequency $f_x$. The measuring frequency $f_x$ lies in the range $f_{xo}$ to $nf_{xo}$, i.e. $f_{xo} \leq f_x \leq nf_{xo}$, in which $n$ denotes a positive number.

The tension of the reference string or cord 3 is so chosen that its frequency $f_o$ is $nF_{xo}$.

The pulse generator 9 associated with the reference string therefore supplies a sequence of reference pulses $I_o$ of the pulse frequency $F_o=nF_{xo}$, $F_{xo}$ denoting the frequency of the sequence of measurement pulses $I_{xo}$ delivered by the pulse generator 10 associated with the load string 2 when the string is unloaded.

For the sake of facilitating its comprehension, the manner of operation of the measuring apparatus will now be described with reference to examples.

Let the range of measurement of the vibrating string balance extend from 0 kg. to 3 kg. Let it also be supposed that the measuring string or cord 2 is pretensioned by a weight of 1 kg and at this tension has a idle frequency $f_{xo}$ of vibration of 5,000 c.p.s. In accordance with the equation $f_x=b_{xo}\sqrt{1+L/P}$, the maximum frequency of the measuring string at full loading $f_{x\,max}$ is equal to 10,000 c.p.s. The frequency range $F_{xo} \leq F_x \leq n.F_{xo}$ of the impulse generator associated with the load string extends from 10,000 to 20,000 c.p.s. if each time the AC voltage sinks to zero a positive pulse is produced. The pretensioning of the reference string 3 is so chosen that the reference pulse generator 9 delivers a sequence of pulses $I_o$ with a frequency $F_o$ of 20,000 c.p.s. In this case $n$ is therefore equal to 2. In order to determine the presetting count for the time counter 11 and the control counter 15 a constant $K$ is chosen which is a round whole number, for example 10,000. The presetting for the time counter amounts to $n$ times the chosen constant K. In this example, therefore, $Z_z=n.K.=20,000$ ($K=10,000$, $n=2$). The preset count for the control counter 15 amounts to $(n-1)$ times the chosen constant $K$ that is to say $Z_{st}<\frac{1}{8}(n-1).K=10,000$.

Let it be assumed that the weight of the article to be weighed is 1.25 kg. On loading the weighing pan 4 with this weight, the pulse sequence delivered by the measuring pulse generator 10 will have the frequency
$$F_x=F_{xo}\sqrt{1+L/P}=10,000\sqrt{2.25}=15,000 \text{ c.p.s.}$$
The time counter 11 counts the pulses occuring with the frequency $F_o$ in the reference pulse sequency $I_o$, while the measuring counter 16 counts the signal pulses $I_x$ with a frequency $F_x$, and in the first counting phase the control counter 15 counts the pulses of the sequence of pulses $I_o-I_x$ these pulses arriving at the counter with a frequency of $F_o - F_x$.

With a simultaneous inception of counting in all three counters, and when the time counter 11 has reached its preset count $Z_z-20,000$, the measuring counter 16 indicates a count of 15,000 (since from the beginning of counting exactly a second has elapsed, for $t-Z_z/F_o$) and the control counter 15 indicates a count of 5,000. In this condition the control counter is switched by the control pulse emitted by the time counter 11 on reaching its preset count so that the control counter passes into its second counting stage and now counts all $m$th pulses of the pulse sequence $I_o$. As already mentioned, $m$ is a whole number and $n$ is to be a number which at least approximately equal to it, in this counting example $m$ would be equal to $n$ which would be equal to 2.

In the second counting phase the control counter 15 consequently counts a series of pulses of the frequency $F_o/2$, that is to say 10,000 c.p.s. The control counter 15 then counts further until it reaches its preset count $Z_{st}$ of 10,000, that is to say it must count 5,000 further units, for which it will obviously need a time $t$ of 0.5 sec. During this time of 0.5 sec. the measuring counter 16 counts from 15,000 up to 22,500, and at this count is stopped since the control counter 15 has reached its preset count. This count $Z_M$ is equal to the product $KG^2$ so that in this case $Q^2=2.25$. Since $Q^2=F_x/F_{xo}=(1+L/P)$, $L/P=1.251=1.25$, in accordance with what has been assumed, $P=1$ kg., the value of $L=1.25$ kg. is obtained for the weight of the article. In this case the significance of the numerical value for the constant $K$ is particularly clear. The choice of 10,000 for $K$ makes it particularly simple to arrive at the weight of the article to be weighed from the count read out $Z_M$. It is easy to obtain a direct indication of weight. Thus, for example, it is possible to use two counters connected in series as measuring pulse counters, the first counter being again one with a preset count and is arranged to actuate the second counter on reaching its preset count so that the second counter counts from the time at which the preset value of the first counter is reached. If the first counter is set with a preset value of $K$, the second counter only counts the pulses in excess of this constant $K$, in this case only up to 12,500 and simply by setting the decimal point, the correct numerical value for $L$ is indicated. Instead of this it is also possible to use a counter circuit which, for example, counts from a preset count (K) backwards to zero and then counts forwards again. It is clear that such variations are possible without effecting the scope of the invention as defined in the claims.

For the same range of measurement from 0 kg. to 3 kg. and $n=m=2$, the following further worked example is given.

Basic frequency $F_{xo}$  2,000 c.p.s.
Frequency to be measured $F_x$  3,544 c.p.s.
Reference frequency $F_o$  $nF_{xo}=4,000$ c.p.s.

Let a value of 1,000 be chosen for K so that $Z_z=2,000$ and $Z_{st}=1,000$. When the control counter 15 is switched from the first phase over to the second phase, the counts are as follows:
time counter 2,000
measuring counter 1,772
control counter 228 $(=1/2(F_o=F))$.

On reaching the preset count $Z_{st}=1,000$ the control counter must count 772 further units and then switches off the measuring counter 16. While the latter counts the second counting phase of the control counter, the measuring counter continues to count from 1,772 for 1,368 further measuring pulses (2,772 × 1,772/2,000) and indicates a count of 3,140. Since $K=1,000$, the weight of the article therefore amounts to 2.140 kg.

If in this worked example the range of measurement is extended so that its limits are 1 kg. and 8 kg. $n=m=3$. The reference frequency $F_o$ must then amount to 6,000 c.p.s. and the preset counts are $Z_z=3,000$ and $Z_{st}=2,000$.

If the measuring frequency is for example 5,400, (corresponding to a load of 6.29 kg.) the counts at the end of the first counting phase are as follows:
time counter $Z_z$  3,000
control counter  300
measuring counter  2,700.

When the control counter in the second phase has reached a count $Z_{st}$ of 2,000, the measuring counter has a count of 2,700 4,590, which exactly corresponds to the weight of 6.29 kg.

In the case of an unloaded weighing apparatus ($F_x=F_{xo}$) the time counter 11 counts to the preset count of $Z_z$ and the control counter 15 counts as far as its preset count $Z_{st}$ in the first counting phase. The measuring counter then indicates (at the end of the first counting phase of the control counter) a count which is equal to the chosen constant K. No second counting phase occurs. Such a null weighing can then be carried out for controlling the setting of the weighing apparatus, since the chosen constant in practice is an apparatus constant. If, when carrying out the null weighing the indication on the measuring counter does not correspond to this apparatus constant, the tension applied to the reference string or cord and/or to the measuring string 2 can be changed so as to adjust the tare.

In the case of full loading of the balance pan in accordance with the weighing range provided for the balance $F_x=nF_{xo}=F_o$. If under these conditions the time counter 11 has reached its preset count $Z_z$, the control counter 15 will be at zero and the measuring counter will be at ZZ. A further counting phase is then started which lasts until the control counter 15 has counted up to its preset count $ZS_t$.

In the worked examples explained above $n$ is a positive whole number and $m=n$ and it has been found that with this condition an exact squaring of the frequency ratio can be obtained. The factor $n$ determines the reference frequency $F_o=nF_{xo}$ and the preset counts $Z_z=nK$, $Z_{st}=(m-1)K$. The reference frequency $F_o$ can thus be so chosen that $n$ is a decimal number, for example $m=2.5$. For $m$, which determines the stepdown ratio of scaler 14, a whole number value is generally chosen for electronic reasons and in the present case this number can be two or three.

The following worked example is based on the same assumptions as the above second example in order to facilitate comparison.

Range of measurement     1 kg to 2.5 kg: n=2,5
idle frequency $F_{xo}$     2,000 cps
signal frequency $F_x$     3,544 cps
    (corresponds to load of 2.140 kg)
reference frequency $F_o$     5,000 cps
constant K     1,000
preset count $Z_z$     2,500
presetting value $Z_{st}$     1,500

At the end of the first counting phase of the control counter 15 the counts are as follows:
time counter     2,500
control counter     728
measuring counter     1,172.

Up to the time at which it reaches its preset count, the control counter must count a further 772 pulses corresponding to a count from 1,772 to 2,865 in the measuring counter, so that the measuring counter indicates a value of 1.865 kg.

With m equal to 3, the count of the 772 pulses necessary before the preset count of 1,500 corresponds to a counting of 1,642 additional pulses, so that the measuring counter at the end of the counting would indicate a total of 3,414, that is to say a weight of 2.414 kg. It is only when m is equal to 2.5 that the indications 3,140 would be exact again. It is clear that in the given range of measurement a precise squaring of the ratio of the two frequencies is obtained when n=m. When n is less than m the result is greater than the square and when it is greater the result is less than the square. As already mentioned for m itself a whole number is taken for practical grounds since m determines the stepdown in the scaler and circuits with an integral stepdown are substantially simpler to produce. Theoretically it is also possible to choose a suitable fraction for the value of m. n determines the frequency of the reference string and the preset counts. The frequency $F_o$ of the reference string 3 can be easily varied by altering the tension. Furthermore n determines the presetting for the time counter and the control counter. Since these preset counts determine the total count time, they are of greater significance for the results of measurement obtainable than a variation in the frequency of the reference string or cord. In the case of a given value for m it is possible to use slight changes in the reference frequency and/or the preset values to obtain characteristic curves for the measuring apparatus which depart more or less in an upward or downward direction from a precisely quadratic curve. This can be used to compensate for systematic errors in the measuring system. Such systematic errors occur in the case of a vibrating string weighing apparatus especially when short stiff strings are used which are clamped at both ends. An elastic deformation of the string and a displacement of the nodes of vibration occuring with an increase in load causes the frequency to remain below the theoretical value to an extent which increases over the range of measurement. The weighing apparatus indicates a value which is too low. This systematic error can be compensated for if the computing part of the apparatus gives an indication which is too great, that is to say gives results which are greater than the square value.

The numerical value for the constant K is preferably equal to the factor of a power of 10 contained in the numerical value of the basic frequency $F_{xo}$ of the sequence of pulses $I_x$. Thus with a basic frequency $F_{xo} = 2.4 \times 10^3$ it will be $1.10^3$ or 1,000. If K is less than this numerical value, for example 100, the results of measurement will be less precise with a reduced period of measurement.

Instead of weights it is possible to use the above apparatus for measuring forces which are then caused to actuate the measuring string and tension it. The method and the apparatus in accordance with the invention can be applied in all those cases in which the measurement of the square of a frequency ratio is to be indicated directly in digital form. As can be seen from the above described example of application, the method in accordance with the invention provided precise results and the apparatus for carrying out the method is simple in construction, reliable and also sure in operation.

I claim:

1. A method of measuring forces by digitally computing the square of the ratio Q of a signal frequency to a constant basic frequency $f_{xo}$ using a constant reference frequency $f_o$, the signal frequency lying between the value of the basic frequency and n times the basic frequency, comprising the steps of producing a series of electrical pulses $I_x$ with a frequency $F_x$ proportional to the signal frequency $f_x$, feeding this series of pulses to a first counting means for counting, producing a series of electrical reference pulses $I_o$ with a frequency $F_o$ n times greater than the basic frequency $F_{xo}$ having the same proportional relationship to the frequency $f_{xo}$, feeding the reference pulses $I_o$ for counting to a second counting means, feeding pulses $I_o$ in excess of pulses $I_x$ to a third counting means during a first counting phase and during a following phase feeding every mth reference pulse to the third counting means, m and n being at least approximately equal, counting in all three counting means beginning at the same time, switching over the third counting means from the first counting phase to the second phase taking place when the second counting means has received so many reference pulses $I_o$ that its count $Z_z$ stands at n ×K, K being an arbitrary constant, and the first counting means counting the pulses $I_x$ is switched off when the third counting means has reached a count equal to K(n−1), the count $Z_M$ of the first counting means then being at least approximately $KQ^2$, the force to be measured being arranged to influence the tension of a vibrating string, the frequency of the vibration of the string controlling the frequency of the pulses $I_x$, while a reference string is caused to vibrate and the frequency $F_o$ is proportional to the frequency of vibration of this latter string.

2. A method in accordance with claim 1 in which $Q^2$ is exactly computed, m being equal to n.

3. A method in accordance with claim 2 in which m and n are equal to a positive whole number.

4. A method in accordance with claim 1 in which m is greater than n, the count $Z_M$ obtained corresponding to a value greater than $KQ^2$.

5. A method in accordance with claim 1 in which n is less than m and the count $Z_M$ obtained is less than $KQ^2$.

6. A method in accordance with claim 4 or claim 5 in which m is a positive whole number and n m.

7. A method in accordance with claim 1 in which counting of the signal pulses $I_x$ in the first counting means takes place in a first phase up to a count equal to the value of K and in the second phase counting takes place starting at unity from the numerical value of the constant K to the end of counting, and the count at the end of the second phase is indicated.

8. A method in accordance with claim 1 in which the numerical value of K is equal to the factor of a power of ten contained in the value of the basic frequency $F_{xo}$.

9. An apparatus for weighing by digitally computing the square of the ratio Q of a signal frequency to a constant reference frequency, comprising:
  first, second, and third counting means 16, 11, 15, the first counting means 16 being arranged to be switched off by a switching off pulse;
  a switching means 12 which is arranged to be actuated by a control pulse from the second counting means 11;
  a scaling means 14;
  a mixing gate;
  a pulse generator 10 for producing signal pulses $I_x$, the output of this pulse generator being connected with the input of the first counting means 16;
  a second pulse generator 9 adapted to produce reference pulses $I_o$, the output of the latter generator being connected with the second counting means, the second counting means being adapted to give a control pulse when it has reached a certain preset count, the third counting means passing a switch-off pulse to the first counting means, the input of the third counting means being connected in response to the switching means as controlled by the control pulse of the second counting means 11 successively with the output of the two pulse generators 9, 10 via the mixing gate 13, which is arranged only to allow the passage of pulses $I_o$ in excess of signal pulses $I_x$ for counting, and with the output of the reference pulse generator via the scaling means;

and a switch-on circuit means which is associated with the counting means and with the switch means, the switch-on circuit means serving to bring the switch means into a starting condition and to initiate operation of all three counting means, two strings being arranged to vibrate and control the frequency of the reference pulses and the signal pulses, the string controlling the frequency of the signal pulses being arranged to be connected with an article to be weighed.

10. An apparatus in accordance with claim 9 in which the switch-on circuit means comprises a push button 17.

11. An apparatus in accordance with claim 9 in which the switch-on circuit means is arranged to bring about automatic repeated operation of the apparatus at regularly successive points in time.

12. An apparatus in accordance with claim 9 further comprising a frequency monitoring means responsive to the pulses $I_x$ and arranged to give a resetting pulse to the counting means when a variation in the frequency of the pulses $I_x$ occurs during operation.

13. A method in accordance with claim 1 in which the string responsive to the force to be measured and the reference string are caused to vibrate by exciting means which simultaneously serve as frequency sensing means and are driven by amplifiers 7, 8 whose outputs are connected with impulse generators.